United States Patent [19]

Sazaki

[11] 4,337,905
[45] Jul. 6, 1982

[54] BAIL LATCHING AND RELEASING MECHANISM FOR SPINNING REEL OF OUTSIDE SPOOL TYPE

[75] Inventor: Kounin Sazaki, Fukuyama, Japan

[73] Assignee: Ryobi, Ltd., Hiroshima, Japan

[21] Appl. No.: 202,394

[22] Filed: Oct. 30, 1980

Related U.S. Application Data

[63] Continuation of Ser. No. 24,332, Mar. 27, 1979, abandoned.

[30] Foreign Application Priority Data

Apr. 7, 1978 [JP] Japan .................................. 53/45942

[51] Int. Cl.³ .............................................. A01K 89/01
[52] U.S. Cl. ............................................... 242/84.2 G
[58] Field of Search ..................... 242/84.2 G, 84.21 R

[56] References Cited

U.S. PATENT DOCUMENTS 2,942,798  6/1960  Alinari ........................... 242/84.2 G
2,966,314 12/1960  Mombur ....................... 242/84.21 R
4,147,313  4/1979  Sazaki ........................... 242/84.2 G
4,162,048  7/1979  Sazaki ........................... 242/84.2 G Primary Examiner—Billy S. Taylor
Attorney, Agent, or Firm—Sughrue, Mion, Zinn, Macpeak & Seas

[57] ABSTRACT

A bail latching and releasing mechanism for use in a spinning reel of the spool type is disclosed, wherein a kick lever is rotatably disposed about its axis in a support housing. The support housing rotatably supports a bail arm lever connected to one end of a bail arm. The bail arm lever is formed with a recess and a stopper and is spring biased by a return spring. The return spring has a dead point to selectively urge the bail arm lever toward its fishing line winding and releasing positions upon the lever being rotated to exceed the dead point. The kick lever has one end being bent into a rear space so as to abut against a projection formed therein, and has the other end being bent into the recess of the bail arm lever. The axial rotation of the kick lever selectively determines the fishing line winding or releasing position by the selective engagement between the kick lever and the recess.

8 Claims, 6 Drawing Figures

BAIL LATCHING AND RELEASING MECHANISM FOR SPINNING REEL OF OUTSIDE SPOOL TYPE

This is a continuation of application Ser. No. 24,332, filed Mar. 27, 1979, now abandoned.

BACKGROUND OF THE INVENTION

This invention relates to a bail latching and releasing mechanism for an open spool spinning reel, and more particularly to an automatic bail turning mechanism for positioning the same at its fishing line winding position for use in the open spool spinning reel.

According to the conventional spinning reel, an internal kicking mechanism is used to position the bail arm at its fishing line winding or releasing positions. The typical prior art bail mechanism comprises bail arm levers whose ends are secured to supporting blocks provided at symmetrical positions outside of the rotor. One bail arm lever is biased in the bail arm release or rewind direction by a torsion spring. The other bail arm lever engages an outwardly biased slider mounted in the supporting block, such that the slider latches the lever arm in the bail cocked or line out position. When the rotor is turned the protruding slider strikes a slider kick mounted on the reel body to cam the slider inwardly and thereby release the latched lever arm, which returns the bail to its rewind position.

In the typical prior art bail mechanism, the bail arm lever is relatively long, since the pivot point of the bail arm lever which pivotally secures one end of the bail arm is positioned adjacent to a bottom wall of a rotor, so that the device is heavy and difficult to handle. Further, such a conventional mechanism is disadvantageous in that when the bail is released to return to its rewinding position, a severe shock is generated in the reel structure which causes the reel to vibrate and accelerates wear and loosening.

SUMMARY OF THE INVENTION

It is therefore, an object of this invention to overcome the above-mentioned drawbacks and to provide an improved automatic kick type bail latching and releasing mechanism.

Another object of this invention is to provide such a mechanism with a simple structure in which the mechanical shock generated is small compared to that in a conventional device.

Briefly, and in accordance with this invention, one end of a bail arm is pivotally secured to a support housing which rotatably secures a bail arm lever connected to the bail arm end, and which is integral with the rotor. The bail arm lever is selectively spring biased toward the fishing line winding and release position by a dead point spring. A kick lever is rotatably disposed about its axis in the support housing along the direction parallel to the longitudinal direction of the support housing. The kick lever has one end formed with a lever portion and the other end formed with a locking portion, both extending perpendicular to the longitudinal portion of the kick lever. The lever portion is extended into a space to abut against a projection secured to a stationary portion of the reel bdy, and the locking portion is extended into the bail arm support.

The fishing line rewinding position is realized by the axial rotation of the kick lever because of the abutment of the lever portion against the projection, thus turn the locking portion to rotate the bail arm lever against the biasing force of the dead point spring. The dead point spring has a central dead point where the biasing direction is changed upon the bail arm lever being rotated to exceed the dead point.

The bail arm lever further provides a stopper adapted to abut against a post disposed on the support housing to prevent further rotation of the bail arm lever by the biasing force of the dead point spring, to thereby maintain the fishing line rewinding position.

These and other objects of this invention will become apparent from the description of the drawings and the preferred embodiment which follows.

DETAILED DESCRIPTION OF THE INVENTION

Figure 1:
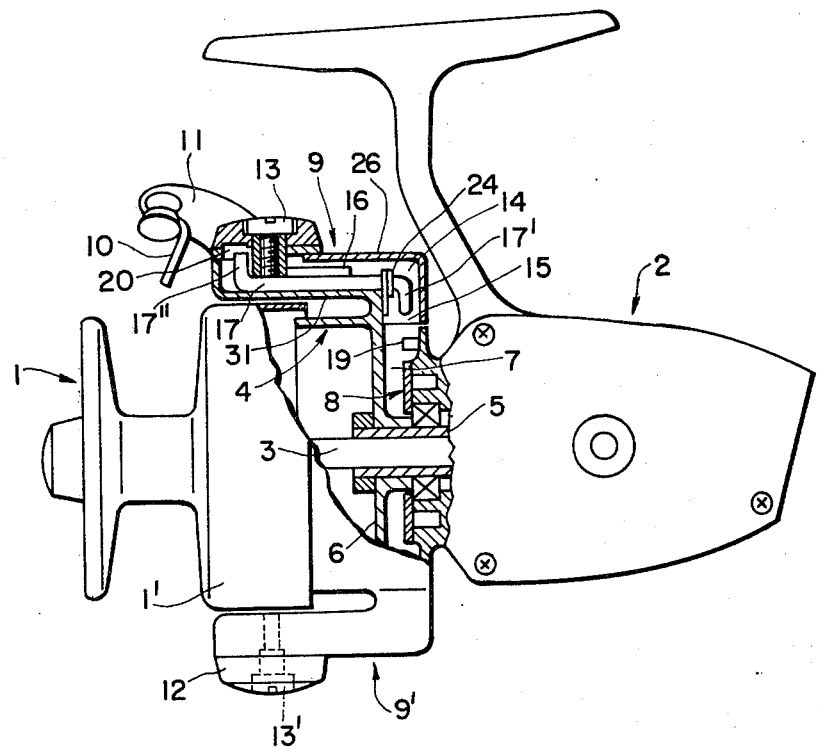
FIG. 1 is a side view, with some parts shown in vertical section, of an open-spool spinning reel according to this invention.

Referring now to the drawings, and initially to FIG. 1, a pair of support housing 9,9' are symmetrically disposed on diametrically opposite sides of a rotor 4, which is mounted through a bearing portion 8 on a tubular shaft 5 to reel body 2. The rotor 4 is rotatably disposed in a cylindrical portion 1' of the spool 1. The shaft 5 has a pinion (not shown) at one end and is rotated by a handle (not shown) coupled thereto by a main gear (not shown). A spool 1 is supported by a spool shaft 3 inserted into the tubular shaft 5. The spool shaft 3 is reciprocable by a reciprocating mechanism (not shown) in synchronism with the main gear to reciprocate the spool 1.

A bail arm 10 has one end coupled to a bail arm lever 11 pivotally secured to the support housing 9 by means of a shouldered step screw 13, and has the other end coupled to a bail arm cam 12 pivotally secured to the support housing 9' by means of a shouldered step screw 13'. A space 7 is defined between a bottom wall 6 of the rotor 4 and the stationary bearing portion 8. Further a spaced portion 14 is provided at the rear portion of the support housing 9 which secures the bail arm lever 11. The spaced portion is defined between an outer wall 31 of the rotor 4 and a cover plate 26. The rear portion of the spaced portion 14 is formed with an opening 15 which communicates the space 7. Within an interior space of the spaced portion 14, a dead-point-spring 16 is disposed having one end supported by the support housing 9 and the other end supported by the bail arm lever 11 in order to selectively bias the bail arm lever 11 with respect to a dead point a (FIG. 2) toward the fishing line winding or releasing position.

Figure 2:
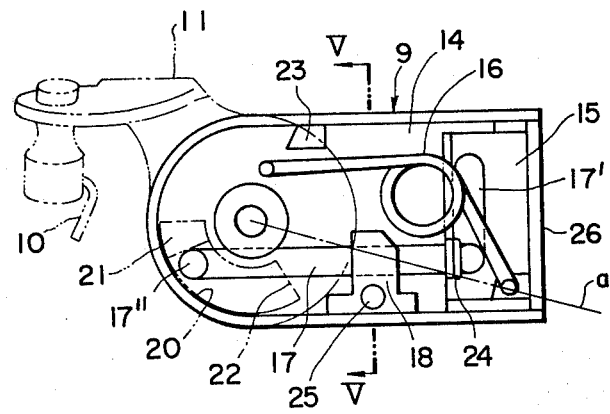
FIG. 2 is a plan view illustrating the essential parts of a bail latching and releasing mechanism, showing the bail arm at its fishing line winding position.
Figure 3:
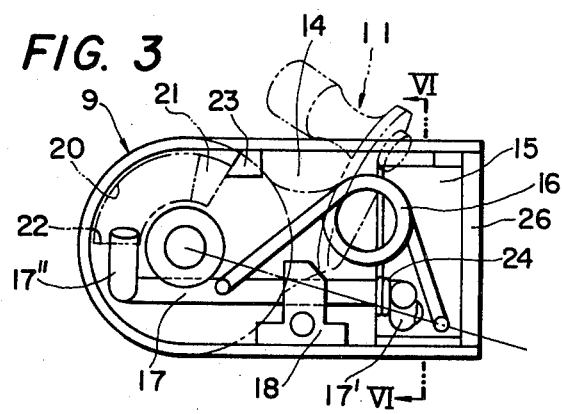
FIG. 3 is a plan view illustrating the essential parts of a bail latching and releasing mechanism, showing the bail arm at its fishing line release position.

A kick lever 17 is also disposed in the spaced portion 14. The kick lever 17 as shown in FIGS. 2 and 3, is rotatably supported about its axis by a support member 18. The support member 18 prevents the kick lever 17 from moving along the axial direction thereof. The kick lever 17 is of circular shape in cross section, and both end portions thereof are bent perpendicularly to the longitudinal direction of the lever 17 and extended in different directions so as to form a desired angle θ as shown in FIG. 6.

One of the bent portions is a lever portion 17' adapted to extend into the space 7 through the opening 15 so as to perform abutting engagement with a circular projection 19 extending from the stationary bearing portion 8, while the other of the bent portions is a locking portion 17" adapted to be inserted in a fan-shaped recess 20 formed in a bottom surface of the bail arm lever 11. The end portion 17'a of the lever portion 17' has a semispherical shape so as to perform smooth contact with the circular projection 19.

Figure 4:
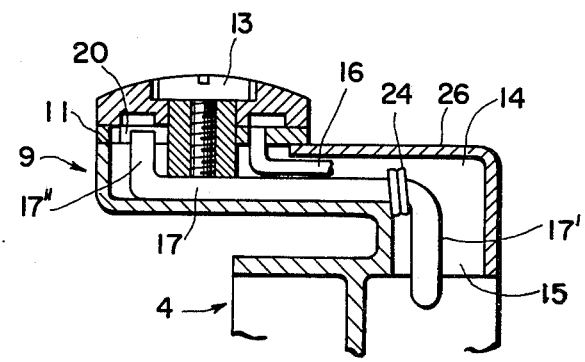
FIG. 4 is a cross-sectional view illustrating the essential part of a bail latching and releasing mechanism.
Figure 5:
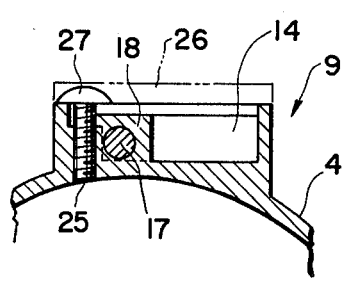
FIG. 5 is a cross-sectional view taken along the line V—V of FIG. 2.

As shown in FIGS. 2 to 4, the bail arm lever 11 has a bottom surface having a circular shape and provided with the fan-shaped recess 20 formed along the circumferential direction thereof. The recess 20 has one end functioning as a locking furface 22, and has the other end provided with a stopper 21. The bail arm lever 11 and the bail arm 10 are maintained at their fishing line winding position by the abutting engagement between the stopper 21 and the locking portion 17" as shown in FIG. 2, and the lever 11 and the arm 10 are maintained at their fishing line release position by the abutting engagement between the locking portion 17" and the locking surface 22 and between the stopper 21 and a post 23 extending from the support housing 9 as shown in FIG. 3.

Figure 6:
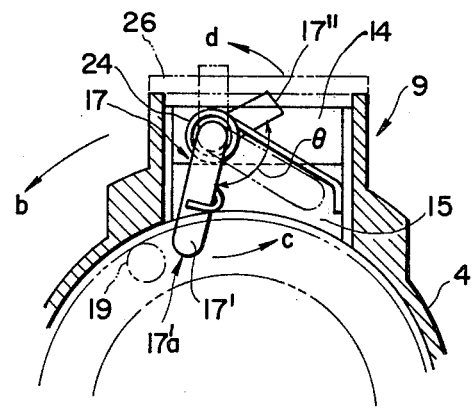
FIG. 6 is a cross-sectional view taken along the line VI—VI as viewed from the direction shown by an arrow in FIG. 3.

The kick lever 17 is further provided with a biasing spring 24 so as to urge the lever 17 toward its fishing line release position as shown in FIG. 3 or as shown by solid line in FIG. 6. Be more specific, the biasing spring 24 is wound around the kick lever 17 and having one end connected to the lever portion 17' and the other end being in surface engagement with a side wall of the support housing (FIG. 6). The biasing spring urges the kick lever 17 toward its fishing line release position whereat the lever portion 17' is positioned so as to bring it into abutment with the circular projection 19, and the locking portion 17" is positioned so as to maintain engagement with the locking surface 22 with its inclined state. The support housing 9 is rotated together with the rotation of the rotor 4 to perform abutment of the lever portion 17' against the circular projection 19, to thus rotate the kick lever 17 about its axis against the biasing force of the spring 24. Therefore, the locking portion 17" is directed upwardly as shown by a chain lie in FIG. 6 to render the bail arm lever 11 to be rotated in counter-clockwise direction in FIG. 3 against the force of the dead-point-spring 16. The bail arm lever 11 is rotated by the pivotal movement of the locking portion 17" to the rotating distance which slightly exceeds the dead point a, so that upon the bail arm lever 11 being rotated to exceed the dead point a, the bail arm lever 11 is further rotated in the counter-clockwise direction by the biasing force of the dead point spring 16, to thus maintain the position shown in FIG. 2. Reference numeral 25 designates a female thread adapted to threadingly engage a thread 27 to secure the cover plate 26 to the support housing 9.

With the structure thus organized, in the fishing line release-position shown in FIGS. 3 and 6, the bail arm lever 11 is maintained at its fishing line release position by the biasing force of the dead-point-spring 16, while the kick lever 17 is positioned by the biasing force of the spring 24 so as to maintain the lever portion 17' capable of being brought into abutment with the circular projection 19 and maintain the locking portion 17" in slanting state capable of performing surface engagement with the locking surface 22 of the bail arm lever 11 as shown by solid line in FIG. 6.

By rotating the handle, the rotor 4 is rotated toward the direction shown by an arrow b in FIG. 6, to thus contact the semispherical end portion 17'a with the circular projection 19, resulting in rotating the lever portion 17' toward the direction shown by an arrow c against the biasing force of the spring 24. Therefore, the kick lever 17 is rotated about its axis to upstand the locking portion 17" as shown by the chain line of FIG. 6 toward the direction shown by an arrow d. The movement of the locking portion 17" pressingly urges the locking surface 22 of the bail arm lever 11 in the counter-clockwise direction in the drawing against the biasing force of the dead-point-spring 16 to the position slightly exceeding the dead point a.

Upon exceeding the dead point of the dead-point-spring 16, the dead-point-spring 16 generates a biasing force in the opposite direction to thus further rotate the bail arm lever 11, resulting in that the stopper 21 is brought into contact with the locking portion 17" with its upstanding position as shown in FIG. 2, whereby the fishing line winding position is attained.

In this case, since the stopper 21 maintains surface contact with the locking member 17" with its upstanding position, and since the biasing force of the dead-point-spring 16 is larger than that of the spring 24, the rotating locus of the lever portion 17' is deviated from the circular projection 19, whereby fishing line winding operation is smoothly performed without abutting the lever portion 17' against the circular projection 19.

If the fisherman wishes to change fishing line winding position to release position, the bail arm 10 is manually turned toward its fishing line release position against the biasing force of the dead-point-spring 16, therefore, the bail arm lever 11 is rotated in the clockwise direction to disengage the stopper 21 from the locking portion 17". Upon disengagement, the kick lever 17 is rotated about its axis to rotate the locking portion 17" and the lever portion 17' to the directions opposite to the directions shown by arrows d, c, respectively by the biasing force of the spring 24, and therefore, the lever portion 17' is positioned as shown by the solid line of FIG. 6 so as to perform the next rewinding operation.

On the other hand, if the bail arm lever 11 is rotated to exceed the dead point a, the lever 11 is further rotated in clock-wise direction by the biasing force of the dead-point-spring 16, and the rotation of the bail arm lever 11 is stopped upon the stopper 21 being in abutment on the post 23, whereat the locking portion 17" is inclined as shown by the solid line of FIG. 6 to contact with the locking surface 22, to thus maintain fishing line release position as shown in FIG. 3.

In view of the foregoing, according to the present invention, the bail arm 10 is automatically shifted from its fishing line release position to rewinding position, with a simple mechanism, to thereby provide compact and ecconomical reel device. Further, since the kick lever 17 is relatively long and is rotatably disposed in the support housing and extended to the direction in parallel therewith, the pivot point of the bail arm lever 11 can be disposed adjacent to the front portion of the rotor 4, to thereby provide the bail arm lever 11 in short length, resulting in providing easy manual handling.

Furthermore, since the fishing rewinding position is established by the movement of the locking portion 17", mechanical shock can be eliminated in comparison with the conventional device, and moreover, the spaced portion 14 can further incorporate means for controlling turning force of the bail arm 10.

In the embodiment described the above, the dead-point-spring 16 is housed together with the kick lever 17 in the support housing 9. However, it is apparent that the dead-point-spring can be housed in the other support housing 9'.

While the invention has been described in detail and with reference to specific embodiment thereof, it will be apparent to one skilled in the art that various changes and modifications can be made therein without departing from the spirit and scope thereof.

What is claimed is:

1. A bail latching and releasing mechanism for use in a spinning reel of the outside spool type including a pair of support housings symmetrically disposed on a rotor to support ends of a bail arm, comprising:
   (a) a bail arm, a bail arm lever coupled to an end of said bail arm, and being rotatably secured to one of said support housings,
   (b) a dead point spring disposed in said one of said support housings for biasing said lever arm in opposite directions relative to its dead point, and
   (c) a kick lever rotatably disposed about its axis and extending into said one of said support housings, said kick lever having a bent end, a space disposed rearwardly of said rotor, said bent end extending into said space to form a lever portion, a projection disposed in said space and adapted to engage said lever portion, the opposite end of said kick lever being bent into said bail arm lever to form a locking portion to thereby permit locking engagement therewith, and
   wherein said bail arm lever is provided with a circular bottom surface, said bottom surface being formed with a recess adapted to receive said locking surface, said recess having one end functioning as a locking surface adapted to permit surface contact with said locking portion in the fishing line release position, and having the other end provided with a stopper adapted to permit surface engagement with said locking portion in the fishing line rewinding position.

2. The mechanism of claim 1, wherein said recess is in the form of a fan-shape along the circumferential direction of said circular bottom surface of said bail arm lever.

3. The mechanism of claim 1, wherein said dead point spring has one end supported by said one of said support housings and the other end supported by said bail arm lever.

4. The mechanism of claim 1, wherein said lever portion and said locking portion are extended perpendicular to a longitudinal portion of said kick lever, respectively, said lever portion and said locking portion providing an predetermined angle therebetween.

5. The mechanism of claim 1, wherein said projection has a circular cross section and extends from a stationary bearing portion which defines said rear space with respect to a rear wall of said rotor.

6. The mechanism of claims 3 or 5, wherein said lever portion has a semi-spherical end portion adapted to contact said circular projection.

7. The mechanism of claim 1, further comprising a post extending from said one of said support housings so as to permit surface engagement with said stopper during the fishing line release position in order to prevent further rotation of said bail arm lever by the biasing force of said dead point spring.

8. The mechanism of claim 5, wherein said kick lever is spring biased by a spring, said spring having one end connected to said lever portion and the other end in contact with said one of said support housings to urge said lever portion toward said circular projection.

* * * * *